(12) United States Patent
Ye et al.

(10) Patent No.: US 12,451,979 B2
(45) Date of Patent: Oct. 21, 2025

(54) METHOD, APPARATUS AND SYSTEM FOR MEASURING NONLINEAR CORRELATION PARAMETERS OF NONLINEAR DEVICE

(71) Applicant: Fujitsu Limited, Kawasaki (JP)

(72) Inventors: Tong Ye, Beijing (CN); Zhenning Tao, Beijing (CN); Xiaofei Su, Beijing (CN); Chengwu Yang, Beijing (CN)

(73) Assignee: Fujitsu Limited, Kawasaki (JP)

( * ) Notice: Subject to any disclaimer, the term of this patent is extended or adjusted under 35 U.S.C. 154(b) by 281 days.

(21) Appl. No.: 18/305,655

(22) Filed: Apr. 24, 2023

(65) Prior Publication Data

US 2023/0261765 A1    Aug. 17, 2023

Related U.S. Application Data

(63) Continuation of application No. PCT/CN2020/125281, filed on Oct. 30, 2020.

(51) Int. Cl.
    *H04B 17/13*      (2015.01)
    *G01R 31/28*      (2006.01)

(52) U.S. Cl.
CPC ......... *H04B 17/13* (2015.01); *G01R 31/2822* (2013.01)

(58) Field of Classification Search
CPC .............................. H04B 17/13; G01R 31/2822
See application file for complete search history.

(56) References Cited

U.S. PATENT DOCUMENTS

2007/0069813 A1\*   3/2007   Li .................... H03F 1/3258
                                                     330/149
2011/0163806 A1    7/2011   Hongo
(Continued)

FOREIGN PATENT DOCUMENTS

CN     106533998 A     3/2017
CN     109425786 A     3/2019
(Continued)

OTHER PUBLICATIONS

Yen-Long Kuo, "Noise Loading Analysis of a Memoryless Nonlinearity Characterized by a Taylor Series of Finite Order," IEEE Transactions on Instrumentation and Measurement, vol. IM-22, No. 3, Sep. 1973.

(Continued)

*Primary Examiner* — Ayodeji O Ayotunde
(74) *Attorney, Agent, or Firm* — STAAS & HALSEY LLP

(57) ABSTRACT

A method, an apparatus and a system to measure nonlinear correlation parameters of a nonlinear device, a processor to, perform band-stop filtering on a signal to be measured to generate a notch signal, and calculate a first nonlinear correlation parameter of the nonlinear device when the signal to be measured is transmitted according to a first output signal of the nonlinear device after the notch signal is input into the nonlinear device; calculate gain compression correction coefficients according to a second output signal of the nonlinear device after the first input signal is input into the nonlinear. The first input signal and the signal to be measured may have identical power and different signal probability distribution. The processor is to correct the first nonlinear correlation parameter according to the gain compression correction coefficients to obtain a second nonlinear correlation parameter of the nonlinear device when the signal to be measured is transmitted.

17 Claims, 9 Drawing Sheets

(56) References Cited

U.S. PATENT DOCUMENTS

| | | | |
|---|---|---|---|
| 2011/0187455 A1 | 8/2011 | Sun et al. | |
| 2014/0358489 A1* | 12/2014 | Kang | G01N 29/2437 |
| | | | 702/191 |
| 2017/0078046 A1* | 3/2017 | Chen | H04L 5/006 |
| 2019/0064236 A1 | 2/2019 | Verspecht et al. | |
| 2020/0106523 A1 | 4/2020 | Zhang et al. | |

FOREIGN PATENT DOCUMENTS

| | | |
|---|---|---|
| CN | 110971295 A | 4/2020 |
| CN | 111125897 A | 5/2020 |
| CN | 111245512 A | 6/2020 |
| CN | 111800194 A | 10/2020 |

OTHER PUBLICATIONS

Khaled Gharaibeh, et al., "The applicability of Noise Power Ratio (NPR) in real communication signals," 67th ARFTG Conference, 2006.

Sucharita Sarkar et al., "Modulating nonlinear optical properties of impurity doped quantum dots via the interplay between anisotropy and Gaussian white noise", Superlattices and Microstructures 90 (2016) 297-307.

International Search Report of International Searching Authority (ISA) (PCT/ISA/210) issued in International Application No. PCT/CN2020/125281 dated Jul. 26, 2021.

Written Opinion of ISA (PCT/ISA/237) issued in International Application No. PCT/CN2020/125281 dated Jul. 26, 2021.

* cited by examiner

RELATED ART

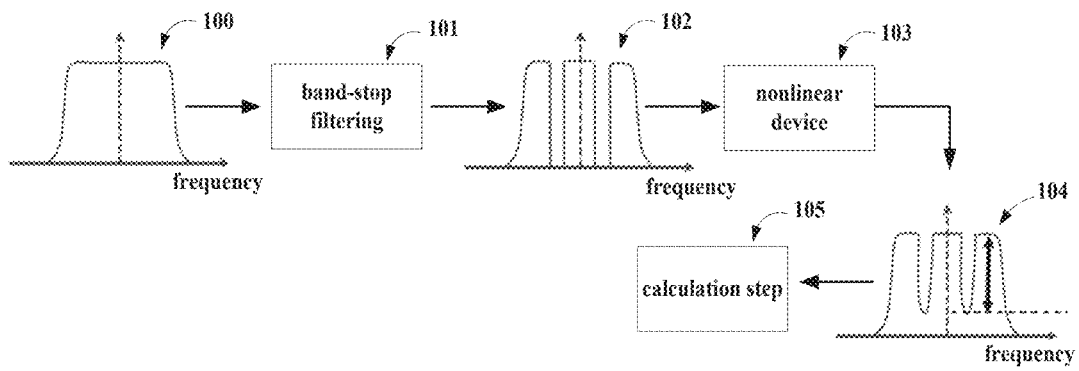

FIG. 1

201 performing band-stop filtering on a signal to be measured to generate a notch signal, and calculating a first nonlinear correlation parameter of the nonlinear device when the signal to be measured is transmitted according to a first output signal of the nonlinear device after the notch signal is inputted into the nonlinear device

202 calculating gain compression correction coefficients according to a second output signal of the nonlinear device after the first input signal is inputted into the nonlinear device, the first input signal and the signal to be measured having identical power and different signal probability distribution

203 correcting the first nonlinear correlation parameter according to the gain compression correction coefficients to obtain a second nonlinear correlation parameter of the nonlinear device when the signal to be measured is transmitted

FIG. 2

501 calculating a ratio of power of the third output signal to power of the signal to be measured and take the ratio as the first coefficient a

502 calculating a ratio of power of the second output signal to power of the first input signal and take the ratio as the second coefficient b

METHOD, APPARATUS AND SYSTEM FOR MEASURING NONLINEAR CORRELATION PARAMETERS OF NONLINEAR DEVICE

CROSS-REFERENCE TO RELATED APPLICATIONS

This application is a continuation application of PCT international application no. PCT/CN2020/125281, filed on Oct. 30, 2020, in the China National Intellectual Property Administration, the entire contents of which are incorporated herein by reference.

TECHNICAL FIELD

The present application relates to the field of communication technology.

BACKGROUND

In the field of radio frequency microwaves, communications, and optical communications, more and more high frequency devices such as 40 GHz bandwidth radio frequency amplifiers, broadband coherent optical receivers (with transimpedance amplifiers), etc. are put into application in order to achieve signal transmission at greater bandwidth and more frequency bands. However, high frequency devices tend to have some performance imperfections. For example, broadband radio frequency amplifiers may have nonlinear effects that degrade the signal transmission performance of high frequency devices. Therefore, the researchers put forward some indexes and measurement methods to measure the magnitude of the nonlinear effects in the devices, which can be used to optimize the design of devices, predict the effects of nonlinear degradation and select the correct devices and the like.

The most commonly used index for measuring non-linear effects is total harmonic distortion (THD), i.e. the degree of non-linearity is estimated by observing the magnitude of the harmonic wave generated by an input signal of a single frequency at an output end of the system under test. However, this method is very inaccurate, especially in larger bandwidth applications, where the nonlinear magnitudes at high and low frequencies are far apart.

Another existing method is to pass the signal to be measured through band-stop filtering to form a signal with notches (i.e. a notch signal). The notch signal passes through the nonlinear device to obtain an output signal, the power at the notch position in the output signal is measured as nonlinear noise. The nonlinear noise reflects the nonlinear degree of the nonlinear device when transmitting the signal to be measured. This method is called a conventional power to noise ratio (PNR) test method.

The aforementioned THD or PNR may be referred to as nonlinear correlation parameters of the nonlinear device.

FIG. 1 is a schematic diagram of a conventional PNR test method. As shown in FIG. 1, the signal to be measured 100 is subjected to a band-stop filtering 101 to form a notch signal 102, the notch signal 102 is input into a nonlinear device 103, an output signal of the nonlinear device 103 is 104, and in a calculation operation 105, a PNR of the output signal 104 is calculated as a nonlinear correlation parameter of the nonlinear device 103 when transmitting the signal to be measured 100.

It should be noted that, the above introduction to the background is merely for the convenience of clear and complete description of the technical solution of the present application, and for the convenience of understanding of persons skilled in the art. It cannot be regarded that the above technical solution is commonly known to persons skilled in the art just because that the solution has been set forth in the background of the present application.

SUMMARY

The inventor of the present application has found that sometimes the measured nonlinear noise is inaccurate when the conventional PNR test method is used. The inventor has further investigated that the magnitude of the nonlinear noise is related to the signal probability distribution function (PDF). After the signal to be measured is subjected to band-stop filtering, the signal probability distribution of the formed notch signal varies with respect to the signal probability distribution of the signal to be measured. Therefore, the nonlinear noise calculated based on the notch signal varies with respect to the nonlinear noise actually generated when the signal to be measured passes through the nonlinear device. In particular, for the signal to be measured with non-Gaussian distribution, after it is subjected to band-stop filtering, the signal probability distribution of the formed notch signal varies more than the signal probability distribution of the signal to be measured, and therefore, the deviation of the calculated nonlinear noise is also larger. For a real signal, the signal probability distribution refers to the probability distribution of the amplitude of the real signal, and for a complex signal, the signal probability distribution refers to the probability distribution of the modulus of the complex signal.

Embodiments of the present application provide a method, an apparatus and a system for measuring nonlinear correlation parameters of a nonlinear device, in which a first input signal for simulating the filtered part of the notch signals is input into the nonlinear device, and the nonlinear correlation parameters obtained by the conventional PNR test method are corrected according to an output signal of the nonlinear device, so as to be able to accurately obtain the nonlinear correlation parameters of the nonlinear device when the signal to be measured is transmitted. Thus, the nonlinear correlation parameters can be accurately calculated for the signal to be measured having any signal probability distribution, and furthermore, the use of expensive high-frequency waveform analysis equipment can be avoided.

According to a first aspect of an embodiment of the present application, there is provided with an apparatus for measuring nonlinear correlation parameters of a nonlinear device, including: a first processing unit configured to perform band-stop filtering on a signal to be measured to generate a notch signal, and calculate a first nonlinear correlation parameter of the nonlinear device when the signal to be measured is transmitted according to a first output signal of the nonlinear device after the notch signal is inputted into the nonlinear device; a second processing unit configured to calculate gain compression correction coefficients according to a second output signal of the nonlinear device after the first input signal is inputted into the nonlinear device, the first input signal and the signal to be measured having identical power and different signal probability distribution; and a third processing unit configured to correct the first nonlinear correlation parameter according to the gain compression correction coefficients to obtain a second nonlinear correlation parameter of the nonlinear device when the signal to be measured is transmitted.

According to a second aspect of an embodiment of the present application, there is provided with a method for measuring nonlinear correlation parameters of a nonlinear device, including: performing band-stop filtering on a signal to be measured to generate a notch signal, and calculating a first nonlinear correlation parameter of the nonlinear device when the signal to be measured is transmitted according to a first output signal of the nonlinear device after the notch signal is inputted into the nonlinear device; calculating gain compression correction coefficients according to a second output signal of the nonlinear device after the first input signal is inputted into the nonlinear device, the first input signal and the signal to be measured having identical power and different signal probability distribution; and correcting the first nonlinear correlation parameter according to the gain compression correction coefficients to obtain a second nonlinear correlation parameter of the nonlinear device when the signal to be measured is transmitted.

According to a third aspect of an embodiment of the present application, there is provided with a system for measuring filtering characteristics, wherein the system includes an apparatus for measuring nonlinear correlation parameters of a nonlinear device according to the first aspect mentioned above and a nonlinear device.

The advantageous effects of the embodiments of the present application is that, a first input signal for simulating the filtered part of the notch signals is input into the nonlinear device, and the nonlinear correlation parameters obtained by the conventional PNR test method are corrected according to an output signal of the nonlinear device, so as to be able to accurately obtain the nonlinear correlation parameters of the nonlinear device when the signal to be measured is transmitted. Thus, the nonlinear correlation parameters can be accurately calculated for the signal to be measured having any signal probability distribution, and furthermore, the use of expensive high-frequency waveform analysis equipment can be avoided.

With reference to the Description and drawings below, a specific embodiment of the present application is disclosed in detail, which specifies the manner in which the principle of the present application can be adopted. It should be understood that, the scope of the embodiment of the present application is not limited. Within the scope of the spirit and clause of the appended claims, the embodiment of the present application includes many variations, modifications and equivalents.

The features described and/or shown for one embodiment can be used in one or more other embodiments in the same or similar manner, can be combined with the features in other embodiments or replace the features in other embodiments.

It should be emphasized that, the term "include/contain" refers to, when being used in the text, existence of features, parts, operations or assemblies, without exclusion of existence or attachment of one or more other features, parts, operations or assemblies.

BRIEF DESCRIPTION OF DRAWINGS

Many aspects of the present application may be better understood with reference to the following drawings. The components in the drawings are not drawn to scale, but merely to illustrate the principle of the present application. For ease of illustration and description of some portions of the present application, corresponding portions of the drawings may be enlarged or reduced. Elements and features described in one drawing or one embodiment of the present application may be combined with elements and features illustrated in one or more other drawings or embodiments. Furthermore, in the drawings, like reference numerals refer to corresponding parts in the several drawings and may be used to indicate corresponding parts used in more than one embodiment.

In the Drawings:

FIG. 1 is a schematic diagram of a conventional PNR test method;

FIG. 2 is a flowchart of a method for measuring nonlinear correlation parameters of a nonlinear device according to Embodiment 1 of the present application;

DESCRIPTION OF EMBODIMENTS

Figure 3:
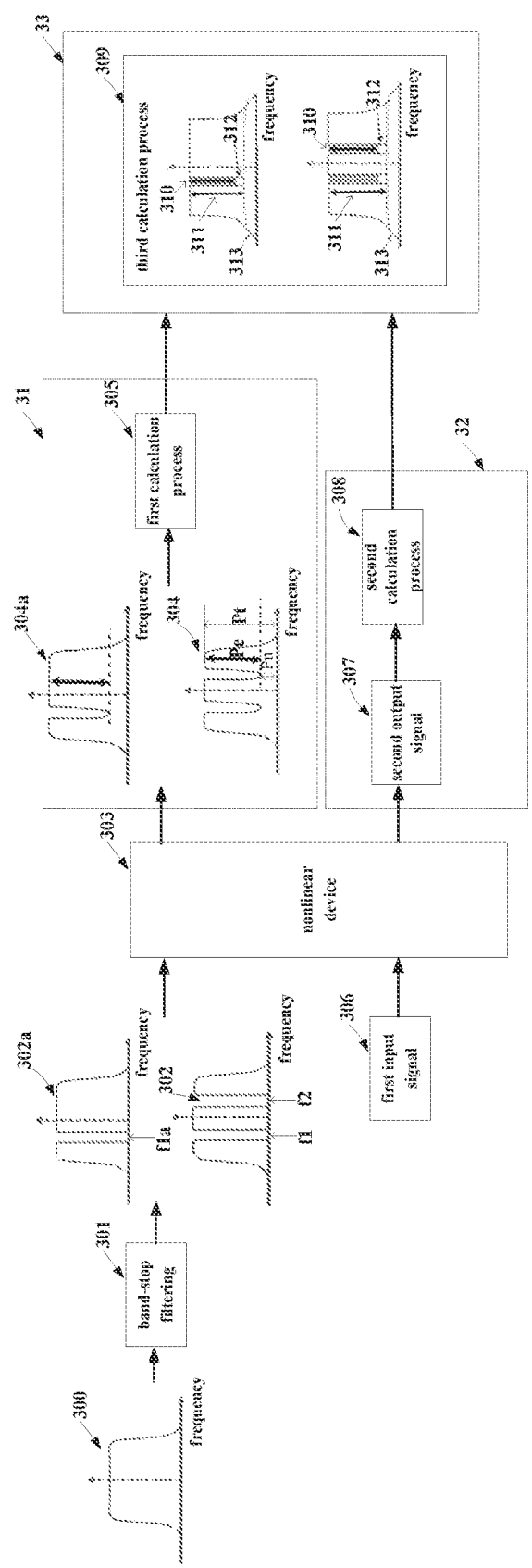
FIG. 3 is a schematic diagram of an example of the method shown in FIG. 2.

With reference to the drawings, the foregoing and other features of the embodiments of the present application will become apparent through the following description. These embodiments are exemplary only and are not limiting of the present application. To enable those skilled in the art to readily understand the principles and embodiments of the present application, the embodiments of the present application will be described using a reconstructed image of image compression process as an example. However, it is understood that the embodiments of the present application are not limited thereto, and the reconstructed images based on other image processing are also within the scope of the present application.

In embodiments of the present application, the terms "first," "second," and the like are used to distinguish different elements from each other in terms of appellation, but do not denote the spatial arrangement or temporal order or the like of these elements, and these elements should not be limited by these terms. The term "and/or" includes any one and all combinations of one or at least two of the associated listed terms. The terms "containing", "comprising", "including", "having" and the like refer to presence of the stated features, elements, components or assemblies, but do not exclude presence or addition of one or at least two other features, elements, components or assemblies.

In embodiments of the present application, the singular form "a," "the" and the like includes the plural form, and is to be understood in a broad sense as "a kind" or "a type" and is not limited to "one"; in addition, the term "said" is to be understood to include both singular and plural forms, unless otherwise specified clearly in the context. In addition, the term "according to" shall be understood to mean "at least partially according to . . . " and the term "based on" shall be understood to mean "based at least partially on . . . ", unless otherwise specified clearly in the context.

Specific embodiments of the present application are described below with reference to the drawings.

Embodiment 1

Embodiment 1 of the present application provides a method for measuring nonlinear correlation parameters of a nonlinear device, and FIG. 2 is a flowchart of the method. As shown in FIG. 2, the method includes:

an operation 201 of performing band-stop filtering on a signal to be measured to generate a notch signal, and calculating a first nonlinear correlation parameter of the nonlinear device when the signal to be measured is transmitted according to a first output signal of the nonlinear device after the notch signal is inputted into the nonlinear device; and an operation 202 of calculating gain compression correction coefficients according to a second output signal of the nonlinear device after the first input signal is inputted into the nonlinear device, the first input signal and the signal to be measured having identical power and different signal probability distribution; and an operation 203 of correcting the first nonlinear correlation parameter according to the gain compression correction coefficients to obtain a second nonlinear correlation parameter of the nonlinear device when the signal to be measured is transmitted.

According to Embodiment 1 of the present application, the first nonlinear correlation parameter is corrected based on the second output signal, whereby the nonlinear correlation parameter calculation error caused by the signal probability distribution difference between the notch signal and the signal to be measured can be eliminated, so as to be able to accurately obtain the nonlinear correlation parameters of the nonlinear device when the signal to be measured is transmitted.

In the present embodiment, the first nonlinear correlation parameter and the second nonlinear correlation parameter are parameters capable of measuring a nonlinear effect of the nonlinear device, and the first nonlinear correlation parameter and the second nonlinear correlation parameter may be, for example, a power to noise ratio (PNR) of an output signal of the nonlinear device. In addition, the present embodiment may not be limited to this, and the first nonlinear correlation parameter and the second nonlinear correlation parameter may also be other parameters calculated based on the output signal of the nonlinear device.

In the present embodiment, when the signal to be measured and the first input signal are real signals, the signal probability distribution refers to the probability distribution of the amplitude of the real signal in the time domain, and when the signal to be measured and the first input signal are complex signals, the signal probability distribution refers to the probability distribution of the modulus of the complex signal in the time domain.

The signal to be measured changes (for example, the frequency, power, signal probability distribution, etc. of the signal to be measured change), and the nonlinear correlation parameters of the nonlinear device when transmitting the signal to be measured also usually change. Therefore, through the method of Embodiment 1, the second nonlinear correlation parameter can be obtained for different signals to be measured, so that the second nonlinear correlation parameter of the nonlinear device when the signal to be measured is transmitted can be measured accurately, so as to form corresponding relationship among the signal to be measured, the nonlinear device and the second nonlinear correlation parameter, and the corresponding relationship can be used to optimize the design of the nonlinear device, predict the effects of nonlinear degradation and select correct the nonlinear device and the like.

FIG. 3 is a schematic diagram of an example of the method shown in FIG. 2. The dashed box 31 in FIG. 3 represents an operation corresponding to operation 201 of FIG. 2. As shown in FIG. 3, in the method for measuring nonlinear correlation parameters of a nonlinear device, the signal to be measured 300 is subjected to a band-stop filtering 301 to form a notch signal 302, the notch signal 302 is input into a nonlinear device 303, a first output signal of the nonlinear device 303 is 304, and a PNR of the first output signal 304 is calculated in a first calculation process 305, and the calculated PNR is used as a first nonlinear correlation parameter of the nonlinear device 303 when transmitting the signal to be measured 300.

The operation of calculating the first nonlinear correlation parameter in the first calculation process 305 may refer to related art. For example, in the calculation process 304, the signal power Pn at the notch frequency of the first output signal 304 may be taken as the power of the nonlinear noise, and the signal power Pt at frequencies other than the notch frequency of the first output signal 304 may be taken as the sum of the power of the nonlinear noise and the effective signal power Pe, whereby Pe=Pt−Pn, PNR=(Pt−Pn)/Pn, and PNR may be taken as the nonlinear correlation parameter. In addition, in the first calculation process 305, other methods may also be used to calculate the nonlinear correlation parameter.

As shown in FIG. 3, the notch signal 302 may have two sets of notch frequencies f1 and f2, and f1 and f2 are symmetric. In addition, in other examples, f1 and f2 may also be asymmetric. Alternatively, the notch signal has only one notch frequency f1a (for example, shown as notch signal 302a in FIG. 3), or the notch signal has more than three notch frequencies. In addition, the more than one notch frequency of the notch signal may be distributed symmetrically or asymmetrically. Here, as shown in FIG. 3, in the case where the notch signal is 302a, the first output signal of the nonlinear device 303 is 304a.

In this embodiment, the detailed embodiment of the dashed box 31 (operation 201 in FIG. 2) of FIG. 3 may refer to the description of the conventional PNR test method in the related art.

The dashed box 32 in FIG. 3 represents an operation corresponding to operation 202 of FIG. 2. As shown in FIG. 3, a first input signal 306 is input into the nonlinear device 303, a second output signal of the nonlinear device 303 is 307, and a gain compression correction coefficient is calculated in a second calculation process 308.

In this embodiment, power of the first input signal is the same as power of the signal to be measured, here, "the same" means that the absolute value of the difference between the two is not greater than a predetermined threshold value TI, which may be, for example, 0.05%. For example, the total power of the first input signal 306 shown in FIG. 3 is P1, the total power of the signal to be measured 300 is P2, |P1-P2|≤T1. Thereby, the influence of the variation of the signal power on calculation of the second nonlinear correlation parameter can be eliminated.

In this embodiment, the signal probability distribution of the first input signal is different from the signal probability distribution of the signal to be measured. In an embodiment, the signal probability distribution of the first input signal may be set based on a part of the signal to be measured that is filtered by the band-stop filtering (e.g., band-stop filtering process 301 in FIG. 3). For example, the signal probability distribution of the first input signal may be the same as or approximate to the signal probability distribution of the part of the signal to be measured that is filtered by the band-stop filtering. In another embodiment, the signal probability distribution of the first input signal may be set according to a Gaussian distribution. For example, the signal probability distribution of the first input signal may be the same as or approximate to the Gaussian distribution. In yet another embodiment, the signal probability distribution of the part of the signal to be measured that is filtered by the band-stop filtering may be weighted and summed with the Gaussian distribution. The signal probability distribution of the first input signal is set to the signal probability distribution resulting from the weighting and addition process.

Figures 4, 5:
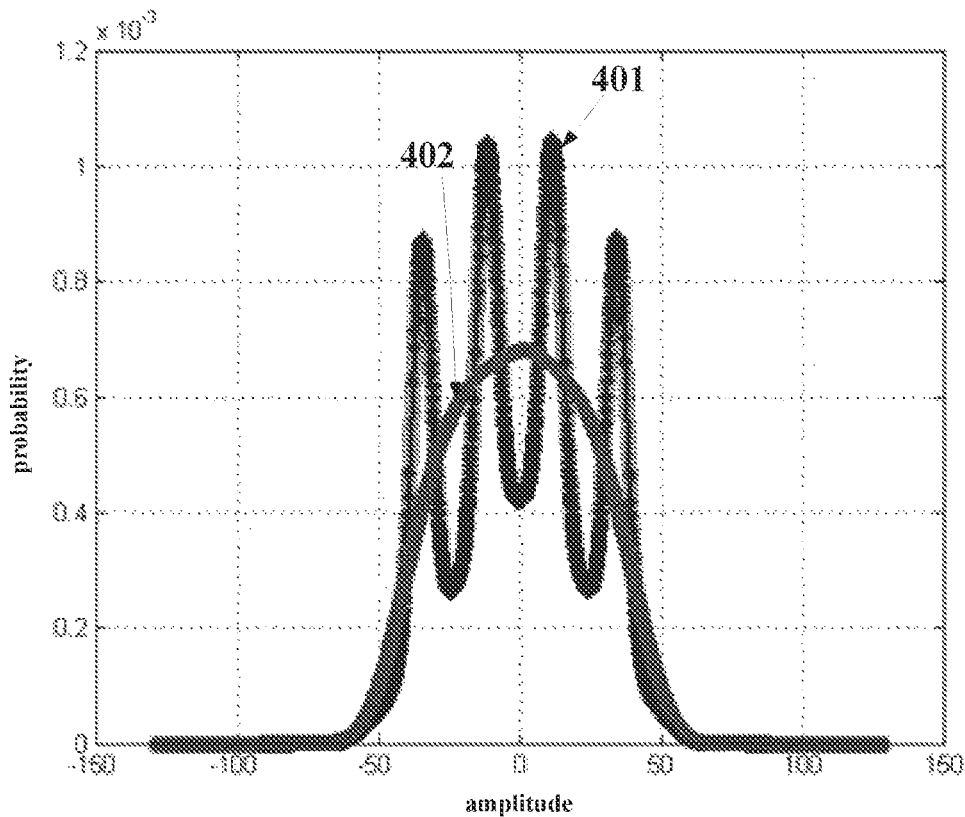
FIG. 4 is a schematic diagram of the signal probability distribution of a first input signal and the signal to be measured.
FIG. 5 is a schematic diagram for calculating a gain compression correction coefficient.

FIG. 4 is a schematic diagram of the signal probability distribution of a first input signal and the signal to be measured. As shown in FIG. 4, the first input signal and the signal to be measured may both be real signals, the amplitude probability distribution of the signal to be measured is represented as a curve 401 and the amplitude probability distribution of the first input signal is represented as a curve 402. The amplitude probability distribution of the first input signal is different from the amplitude probability distribution of the signal to be measured, wherein the amplitude probability distribution of the first input signal is a Gaussian distribution.

In the present embodiment, in the case where the signal probability distribution and the power of the first input signal are set, the first input signal can be generated as in the related art. For example, if the signal to be measured is a single carrier signal, in order to obtain "a first input signal having the same power as the signal to be measured and a signal probability distribution being a Gaussian distribution", this can be achieved by changing the distribution of the symbols of the signal to be measured and retaining the shaped pulses.

In this embodiment, as shown in FIG. 3, the gain compression correction coefficient calculated in the second calculation process 308 (operation 202 in FIG. 2) may include a first coefficient a and a second coefficient b.

The first coefficient a represents a ratio between a root mean square (RMS) amplitude or modulus of a linear term in a third output signal output by the nonlinear device and a root mean square (RMS) amplitude or modulus of the signal to be measured, in the case where the signal to be measured (e.g., 300 in FIG. 3) is input into the nonlinear device (e.g., 303 in FIG. 3). The second coefficient b represents the ratio between the RMS amplitude or modulus of the linear term in the second output signal (e.g., 307 in FIG. 3) and the RMS amplitude or modulus of the first input signal (e.g., 306 in FIG. 3).

The dashed box 33 in FIG. 3 represents an operation corresponding to operation 203 of FIG. 2. As shown in FIG. 3, in the third calculation process 309, the first nonlinear correlation parameter is corrected using the gain compression correction coefficient, thereby obtaining the second nonlinear correlation parameter.

In the third calculation process 309 (operation 203 in FIG. 2), the first nonlinear correlation parameter may be corrected based on the first coefficient a and the second coefficient b. For example, the first nonlinear correlation parameter may be corrected according to the following equation (1):

$$PNR_{ortho} = \frac{\left(1 - \frac{(a-b)^2}{a^2}\right)PNR_{measure}}{1 - \frac{(a-b)^2}{a^2}PNR_{measure}} = \frac{\left(1 - \left(1 - \frac{b}{a}\right)^2\right)PNR_{measure}}{1 - \left(1 - \frac{b}{a}\right)^2 PNR_{measure}} \quad (1)$$

In the equation (1), $PNR_{measure}$ represents the first nonlinear correlation parameter, $PNR_{ortho}$ represents the second nonlinear correlation parameter.

With regard to the equation (1), it should also be noted that when the signal probability distribution of the signal to be measured is a Gaussian distribution, the signal probability distribution of the part of the signal to be measured that is filtered by the band-stop filtering is also a Gaussian distribution, thus a=b, and $PNR_{measure}$ is identical to $PNR_{ortho}$.

In the block diagram of the third calculation process 309, the PNR 310 corresponding to the first nonlinear correlation parameter and the PNR 311 corresponding to the second nonlinear correlation parameter are shown, wherein due to the protrusion 312 of the noise at the notch frequency, an error may be caused between the PNR 310 and the PNR 311. Furthermore, the curve 313 shows quadrature noise in the first output signal 304 or 304*a*.

In this embodiment, as shown in FIG. 3, the signal to be measured 300, the notch signal 302 (302*a*), and the first input signal 306 may all be real signals, or, the signal to be measured 300, the notch signal 302 (302*a*), and the first input signal 306 may all be complex signals.

The operation 202 is described in detail below.

FIG. 5 is a schematic diagram for calculating a gain compression correction coefficient, corresponding to one embodiment of the operation 202.

As shown in FIG. 5, the method of calculating the gain compression correction coefficient includes:

an operation 501 of calculating a ratio of power of the third output signal to power of the signal to be measured and take the ratio as the first coefficient a; and an operation 502 of calculating a ratio of power of the second output signal to power of the first input signal and take the ratio as the second coefficient b.

In the embodiment shown in FIG. 5, it is approximated that the ratio of the amplitude or modulus of the output signal to the input signal of the nonlinear device can be used to calculate the gain compression correction coefficient.

For the operation 501, both the power of the signal to be measured and the power of the third output signal can be measured. For example, the total power on the frequency spectrum of the signal to be measured can be measured as the power $P_{in}(x)$ of the signal to be measured; in the case where the signal to be measured is input into the nonlinear device, the total power on the frequency spectrum of the third output signal output from the nonlinear device is measured as the power $P_{total}(x)$ of the third output signal.

In the operation 501, the first coefficient a may be approximately calculated by the following equation (2):

$$a \approx \sqrt{\frac{P_{total}(x)}{P_{in}(x)}} \quad (2)$$

For the operation 502, both the power of the first input signal and the power of the second output signal can be measured. For example, the total power on the frequency spectrum of the first input signal can be measured as the power $P_{in}(x_g)$ of the first input signal; in the case where the first input signal is input into the nonlinear device, the total power on the frequency spectrum of the second output signal output from the nonlinear device is measured as the power $P_{total}(x_g)$ of the second output signal.

In the operation 502, the second coefficient b may be approximately calculated by the following equation (3):

$$b \approx \sqrt{\frac{P_{total}(x_g)}{P_{in}(x_g)}} \quad (3)$$

According to the embodiment shown in FIG. 5, the gain compression correction coefficient can be calculated in a simple manner from the measured values.

Figure 6:
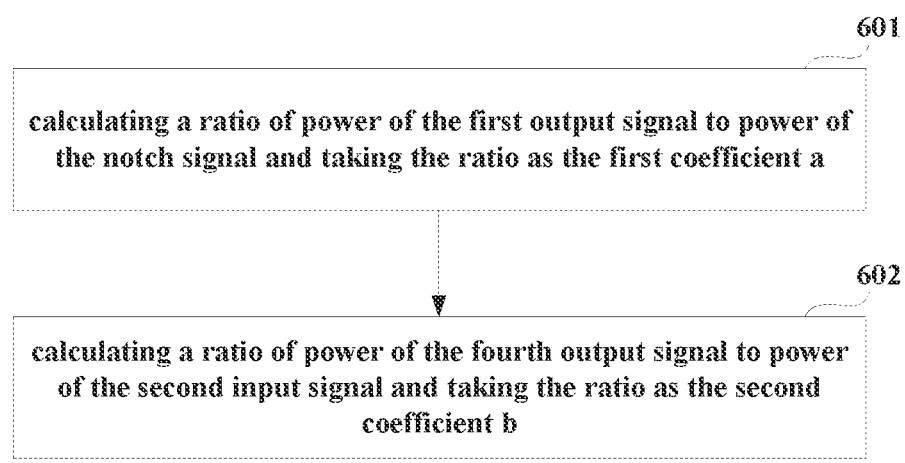
FIG. 6 is another schematic diagram for calculating a gain compression correction coefficient.

FIG. 6 is another schematic diagram for calculating a gain compression correction coefficient, corresponding to another embodiment of the operation 202.

As shown in FIG. 6, the method of calculating the gain compression correction coefficient includes:

an operation 601 of calculating a ratio of power of the first output signal to power of the notch signal and taking the ratio as the first coefficient a; and an operation 602 of calculating a ratio of power of the fourth output signal to power of the second input signal and taking the ratio as the second coefficient b.

In the embodiment shown in FIG. 6, it is approximated that the ratio of the amplitude or modulus of the output signal to the input signal of the nonlinear device can be used to calculate the gain compression correction coefficient in the case where the signal is band-stop filtered and input into the linear device.

For the operation 601, both the power of the notch signal and the power of the first output signal can be measured. For example, the total power on the frequency spectrum of the notch signal (e.g., 302 or 302a in FIG. 3) obtained from the signal to be measured after band-stop filtering can be measured as the power $P_{in}(x-x_{notch})$ of the notch signal; in the case where the notch signal is input into the nonlinear device, the total power on the frequency spectrum of the first output signal output from the nonlinear device is measured as the power $P_{total}(x-x_{notch})$ of the first output signal.

In the operation 601, the first coefficient a may be approximately calculated by the following equation (4):

$$a \approx \sqrt{\frac{P_{total}(x-x_{notch})}{P_{in}(x-x_{notch})}} \quad (4)$$

In the operation 602, the second input signal is a signal obtained by performing the band-stop filtering on the first input signal, and the nonlinear device outputs the fourth output signal after the second input signal is inputted into the nonlinear device.

For the operation 602, both the power of the second input signal and the power of the fourth output signal can be measured. For example, the total power on the frequency spectrum of the second input signal can be measured as the power $P_{in}(x_g-x_{g,notch})$ of the second input signal; in the case where the second input signal is input into the nonlinear device, the total power on the frequency spectrum of the fourth output signal output from the nonlinear device is measured as the power $P_{total}(x_g-x_{g,notch})$ of the fourth output signal.

In the operation 602, the second coefficient b may be approximately calculated by the following equation (5):

$$b \approx \sqrt{\frac{P_{total}(x_g-x_{g,notch})}{P_{in}(x_g-x_{g,notch})}} \quad (5)$$

According to the embodiment shown in FIG. 6, the gain compression correction coefficient can be calculated in a simple manner from the measured values.

Figure 7:
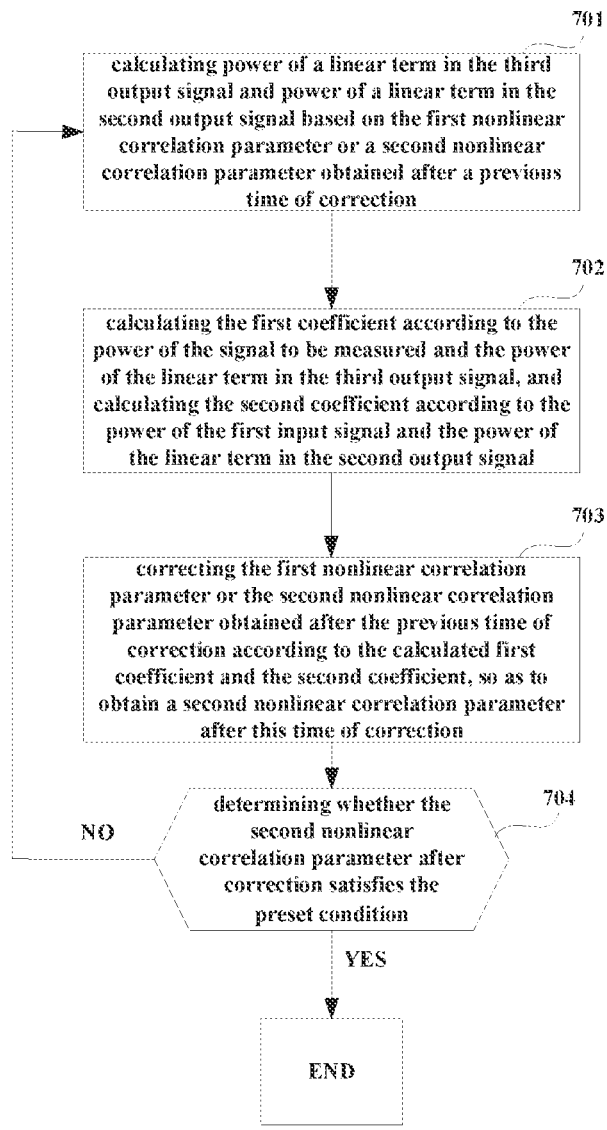
FIG. 7 is yet another schematic diagram for calculating a gain compression correction coefficient.

FIG. 7 is yet another schematic diagram for calculating a gain compression correction coefficient, corresponding to yet another embodiment of the operation 202.

As shown in FIG. 7, the method of calculating the gain compression correction coefficient includes:

an operation 701 of calculating power of a linear term in the third output signal and power of a linear term in the second output signal based on the first nonlinear correlation parameter or a second nonlinear correlation parameter obtained after a previous time of correction;

an operation 702 of calculating the first coefficient according to the power of the signal to be measured and the power of the linear term in the third output signal, and calculating the second coefficient according to the power of the first input signal and the power of the linear term in the second output signal; and an operation 703 of correcting the first nonlinear correlation parameter or the second nonlinear correlation parameter obtained after the previous time of correction according to the calculated first coefficient and the second coefficient, so as to obtain a second nonlinear correlation parameter after this (current) time of correction.

In the operation 701, the total power $P_{total}$ of the output signal of the nonlinear device may be considered as the sum of the power $P_{ortho}$ the linear term and the power $P_{ortho}$ of the quadrature term, and the power $P_{ortho}$ of the quadrature term can be expressed as the product of the reciprocal of $PNR_{ortho}$ (i−1) and the total output power $P_{total}$. Therefore, the linear term power p n be expressed as the following equation (6):

$$P_{corr} = P_{total} - P_{ortho} = P_{total} - \frac{P_{total}}{PNR_{ortho}(i-1)} \quad (6)$$

Wherein $PNR_{ortho}$ represents the first nonlinear correlation parameter or the second nonlinear correlation parameter obtained after the previous time of correction.

In the operation 701, in order to calculate the power of the linear term in the third output signal, the above equation (6) may be converted into the following equation (6a):

$$P_{corr}(x) = P_{total}(x) - \frac{P_{total}(x)}{PNR_{ortho}(i-1)} \quad (6a)$$

Wherein $P_{corr}(x)$ represents the power of the linear term in the third output signal, and $P_{total}(x)$ represents the total power of the third output signal.

In the operation 701, in order to calculate the power of the linear term in the second output signal, the above equation (6) may be converted into the following equation (6b):

$$P_{corr}(x_g) = P_{total}(x_g) - \frac{P_{total}(x_g)}{PNR_{ortho}(i-1)} \quad (6b)$$

Wherein $P_{corr}(x_g)$ represents the power of the linear term in the second output signal, and $P_{total}(x_g)$ represents the total power of the second output signal.

In the operation 702, a first coefficient a is calculated based on the power M of the signal to be measured and the power corr of the linear term in the third output signal, and for example, the first coefficient a may be calculated according to the following equation (7):

$$a = \sqrt{\frac{P_{corr}(x)}{P_{in}(x)}} \quad (7)$$

In the operation 702, a second coefficient b is calculated based on the power $P_{in}(x_g)$ of the first input signal and the power $P_{corr}(x_g)$ of the linear term in the second output signal, and for example, the second coefficient b may be calculated according to the following equation (8):

$$b = \sqrt{\frac{P_{corr}(x_g)}{P_{in}(x_g)}} \quad (8)$$

In the operation 703, the first nonlinear correlation parameter or the second nonlinear correlation parameter obtained after the previous time of correction $PNR_{ortho}(i-1)$ is corrected according to the calculated first coefficient and the second coefficient, so as to obtain a second nonlinear correlation parameter $PNR_{ortho}(i)$ after this time of correction.

For example, in the operation 703, the second nonlinear correlation parameter $PNR_{ortho}(i)$ after this time of correction can be obtained by using the equation (9) similar to the equation (1):

$$PNR_{ortho}(i) = \frac{\left(1 - \frac{(a-b)^2}{a^2}\right)PNR_{ortho}(i-1)}{1 - \frac{(a-b)^2}{a^2}PNR_{ortho}(i-1)} = \frac{\left(1 - \left(1 - \frac{b}{a}\right)^2\right)PNR_{ortho}(i-1)}{1 - \left(1 - \frac{b}{a}\right)^2 PNR_{ortho}(i-1)} \quad (9)$$

In the above equations (6), (6a), (6b) and (9), i may be a natural number for indicating that the current process is which process among cyclic iterative process of the operations 701 to 703. Where, when i=1, it indicates that the current process is the first process (i.e. the initial process) in the cyclic iterative process of the operations 701 to 703, and at this time, the above-mentioned equation (9) is expressed as the following equation (9a):

$$PNR_{ortho}(1) = \frac{\left(1 - \frac{(a-b)^2}{a^2}\right)PNR_{ortho}(0)}{1 - \frac{(a-b)^2}{a^2}PNR_{ortho}(0)} = \frac{\left(1 - \left(1 - \frac{b}{a}\right)^2\right)PNR_{ortho}(0)}{1 - \left(1 - \frac{b}{a}\right)^2 PNR_{ortho}(0)} \quad (9a)$$

Where, $PNR_{ortho}(0)$ represents a first nonlinear correlation parameter, i.e., $PNR_{ortho}(0)$ in the equation (9a) is identical to $PNR_{measure}$ in the equation (1).

In addition, as shown in FIG. 7, the method of calculating the gain compression correction coefficient may further include:

an operation 704 of determining whether the second nonlinear correlation parameter after this time of correction satisfies the preset condition.

When the second nonlinear correlation parameter $PNR_{ortho}(i)$ after this time of correction satisfies the preset condition, the first coefficient a and the second coefficient b calculated by the operation 702 at this time are determined as gain compression correction coefficients, and the second nonlinear correlation parameter $PNR_{ortho}(i)$ after this correction is taken as the second nonlinear related coefficient, namely, $PNR_{ortho}(i)$ is taken as $PNR_{ortho}$ in the equation (1). At this time, since $PNR_{ortho}(i)$ equivalent to $PNR_{ortho}$ has been calculated in the operation 703, the operation 203 in FIG. 2 may not be performed, that is, the operation 202 and the operation 203 of FIG. 2 are implemented through the operations 701 to 704 of FIG. 7.

In addition, when the second nonlinear correlation parameter $PNR_{ortho}(i)$ after this time of correction does not satisfy the preset condition, the second nonlinear correlation parameter $PNR_{ortho}(i)$ after this time of correction is taken as the second nonlinear correlation parameter after the previous time of correction, and a first coefficient (a) and a second coefficient (b) are calculated again, and the second nonlinear correlation parameter after the previous time of correction is corrected, i.e., processing of the (i+1)th operations 701 to 703 are performed.

In the operation 704, the preset condition may be, for example, i reaches a predetermined value, that is, the cycle processing of the operations 701 to 703 reaches a predetermined number of times; or, a ratio of the difference between the second nonlinear correlation parameter $PNR_{ortho}(i)$ after this time of correction and the second nonlinear correlation parameter $PNR_{ortho}(i-1)$ after the previous time of correction to the second nonlinear correlation parameter $PNR_{ortho}(i-1)$ after the previous time of correction is smaller than or equal to the threshold T2, for example, $$\frac{PNR_{ortho}(i) - PNR_{ortho}(i-1)}{PNR_{ortho}(i)} \leq T2;$$

alternatively, the mean square error of $PNR_{ortho}(i)$ calculated for k consecutive times is smaller than the threshold T3, k being a natural number. Furthermore, the present embodiment may not be limited thereto, and the preset condition may also be other conditions.

According to Embodiment 1 of the present application, a first input signal for simulating the filtered part of the notch signals is input into the nonlinear device, and the nonlinear correlation parameters obtained by the conventional PNR test method are corrected according to an output signal of the nonlinear device, so as to be able to accurately obtain the nonlinear correlation parameters of the nonlinear device when the signal to be measured is transmitted. Thus, the nonlinear correlation parameters can be accurately calculated for the signal to be measured having any signal probability distribution, and furthermore, the use of expensive high-frequency waveform analysis equipment can be avoided.

Figure 8:
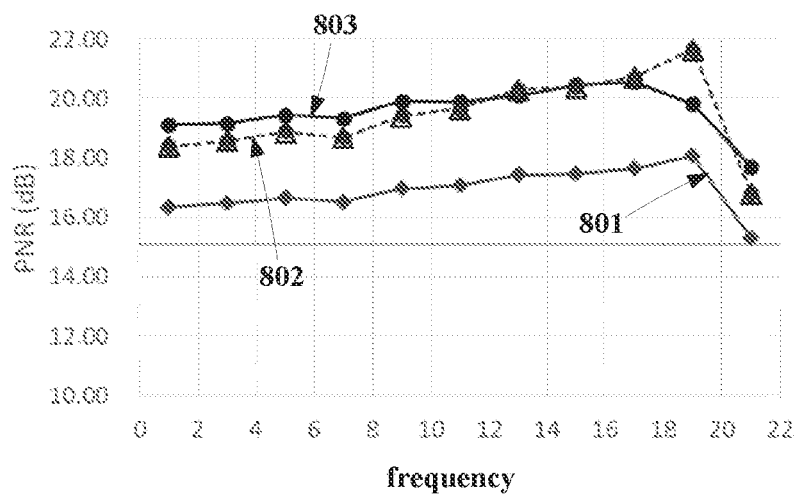
FIG. 8 is a schematic diagram of the effect of the method for measuring nonlinear correlation parameters of a nonlinear device according to Embodiment 1 of the present application.
Figure 10:
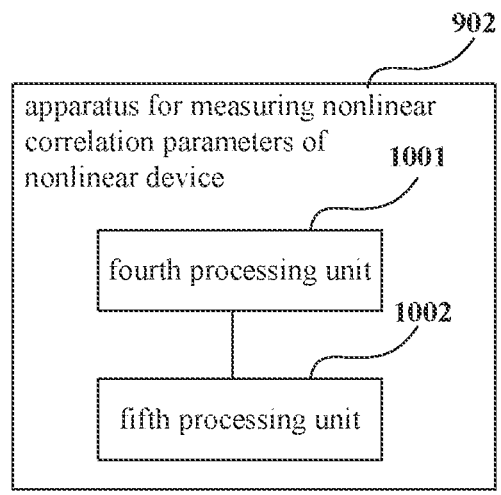
FIG. 10 is a schematic diagram of a second processing unit 902.

FIG. 8 is a schematic diagram of the effect of the method for measuring nonlinear correlation parameters of a nonlinear device according to Embodiment 1 of the present application. As shown in FIG. 10, the broken line 801 represents the PNR at different frequencies obtained using the conventional PNR test method of FIG. 1 (corresponding to the first nonlinear correlation parameter), the broken line 802 represents the PNR at different frequencies obtained using the method of FIG. 1 (corresponding to the second nonlinear correlation parameter), and the broken line 803 represents a target value of PNR at different frequencies (i.e., the actual value of PNR). The horizontal axis represents frequency in GHz and the vertical axis represents PNR in dB.

As shown in FIG. 8, the PNR obtained using the method of Embodiment 1 of the present application is closer to the target value of the PNR than the PNR obtained by the conventional PNR test method. That is, the PNR obtained by the method of Embodiment 1 of the present application is more accurate.

Embodiment 2

Embodiment 2 further provides an apparatus for measuring nonlinear correlation parameters of a nonlinear device. Since the principle of the apparatus for solving the problem is similar to that of the method of Embodiment 1, the specific implementation thereof may refer to the implementation of the method of Embodiment 1, and the same contents are not repeated.

Figure 9:
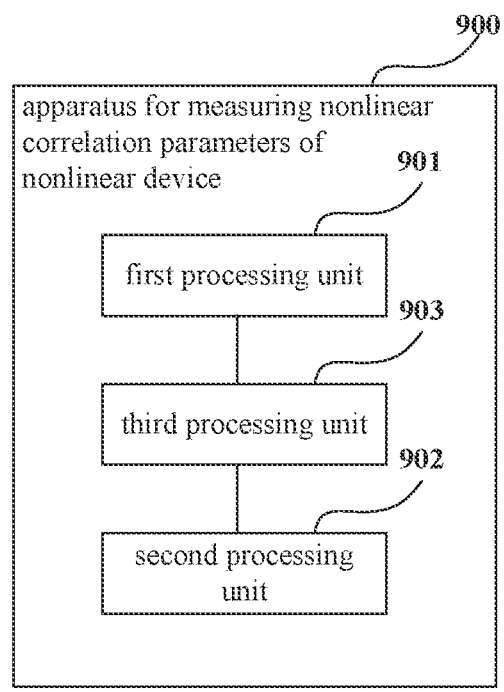
FIG. 9 is a schematic diagram of an apparatus for measuring nonlinear correlation parameters of a nonlinear device according to Embodiment 2 of the present application.

FIG. 9 is a schematic diagram of an apparatus for measuring nonlinear correlation parameters of a nonlinear device according to the present embodiment. As shown in FIG. 9, the apparatus 900 for measuring nonlinear correlation parameters of a nonlinear device includes:

a first processing unit 901 configured to perform band-stop filtering on a signal to be measured to generate a notch signal, and calculate a first nonlinear correlation parameter of the nonlinear device when the signal to be measured is transmitted according to a first output signal of the nonlinear device after the notch signal is inputted into the nonlinear device;

a second processing unit 902 configured to calculate gain compression correction coefficients according to a second output signal of the nonlinear device after the first input signal is inputted into the nonlinear device, the first input signal and the signal to be measured having identical power and different signal probability distribution; and a third processing unit 903 configured to correct the first nonlinear correlation parameter according to the gain compression correction coefficients to obtain a second nonlinear correlation parameter of the nonlinear device when the signal to be measured is transmitted.

In the present embodiment, the first nonlinear correlation parameter or the second nonlinear correlation parameter includes: a power-to-noise ratio.

In the present embodiment, the signal probability distribution of the first input signal includes:

signal probability distribution obtained according to a part of the signal to be measure that is filtered by the band stop filtering; or signal probability distribution obtained according to Gaussian distribution.

In the present embodiment, the gain compression correction coefficient includes a first coefficient and a second coefficient.

The first coefficient represents a ratio of a root-mean-square amplitude or modulus of a linear item in a third output signal of the nonlinear device after the signal to be measured in inputted into the nonlinear device to a root-mean-square amplitude or modulus of the signal to be measured. The second coefficient represents a ratio of a root-mean-square amplitude or modulus of a linear item in the second output signal to a root-mean-square amplitude or modulus of the first input signal.

FIG. 10 is a schematic diagram of a second processing unit 902. As shown in FIG. 10, the second processing unit 902 includes:

a fourth processing unit 1001 configured to calculate a ratio of power of the third output signal to power of the signal to be measured and take the ratio as the first coefficient; and a fifth processing unit 1002 configured to calculate a ratio of power of the second output signal to power of the first input signal and take the ratio as the second coefficient.

Figure 11:
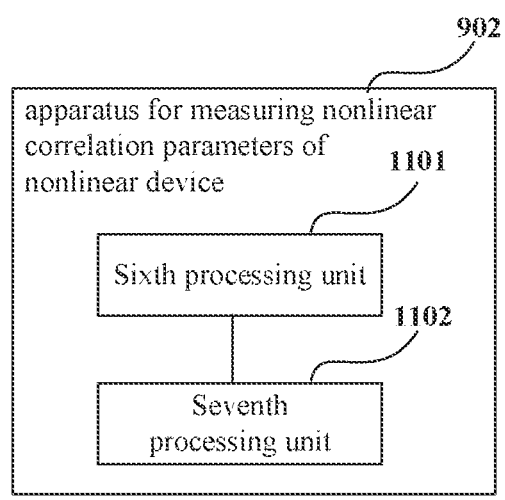
FIG. 11 is another schematic diagram of a second processing unit 902.

FIG. 11 is another schematic diagram of a second processing unit 902. As shown in FIG. 11, the second processing unit 902 includes:

a sixth processing unit 1101 configured to calculate a ratio of power of the first output signal to power of the notch signal and take the ratio as the first coefficient; and a seventh processing unit 1102 configured to calculate a ratio of power of the fourth output signal to power of the second input signal and take the ratio as the second coefficient.

The second input signal is obtained by performing the band-stop filtering on the first input signal, and the nonlinear device outputs the fourth output signal after the second input signal is inputted into the nonlinear device.

Figure 12:
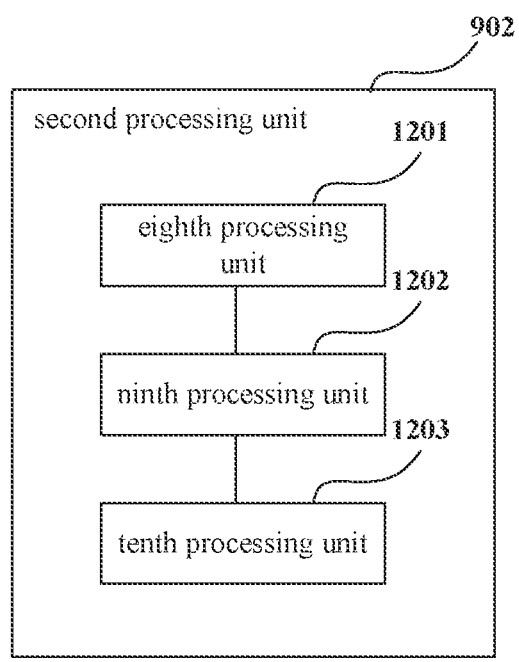
FIG. 12 is yet another schematic diagram of a second processing unit 902.

FIG. 12 is yet another schematic diagram of a second processing unit 902. As shown in FIG. 12, the second processing unit 902 includes:

an eighth processing unit 1201 configured to calculate power of a linear term in the third output signal and power of a linear term in the second output signal based on the first nonlinear correlation parameter or a second nonlinear correlation parameter obtained after a previous time of correction;

a ninth processing unit 1202 configured to calculate the first coefficient according to the power of the signal to be measured and the power of the linear term in the third output signal, and calculate the second coefficient according to the power of the first input signal and the power of the linear term in the second output signal; and a tenth processing unit 1203 configured to correct the first nonlinear correlation parameter or the second nonlinear correlation parameter obtained after the previous time of correction according to the calculated first coefficient and the second coefficient, so as to obtain a second nonlinear correlation parameter after this time of correction.

In FIG. 12, the second nonlinear correlation parameter after this time of correction satisfies a preset condition, the second processing unit 902 determines the calculated first coefficient and the second coefficient as the gain compression correction coefficients, and takes the second nonlinear correlation parameter after this time of correction as the second nonlinear related coefficient. In addition, when the second nonlinear correlation parameter after this time of correction does not satisfy the preset condition, the second processing unit 902 takes the second nonlinear correlation parameter after this time of correction as the second nonlinear correlation parameter after the previous time of correction, and thus calculates a first coefficient and a second coefficient again, and corrects the second nonlinear correlation parameter after the previous time of correction.

When the second processing unit 902 is configured as shown in FIG. 12, the apparatus 900 for measuring nonlinear correlation parameters of the nonlinear device may not be separately provided with the third processing unit 903. That is, the function of the third processing unit 903 is incorporated into the second processing unit 902 shown in FIG. 12.

In the present embodiment, detailed description of each unit may refer to the description of the corresponding operation in Embodiment 1, which will not be repeated here.

According to Embodiment 2 of the present application, it is possible to accurately obtain the nonlinear correlation parameters of the nonlinear device when the signal to be measured is transmitted. Thus, the nonlinear correlation parameters can be accurately calculated for the signal to be measured having any signal probability distribution, and furthermore, the use of expensive high-frequency waveform analysis equipment can be avoided.

Embodiment 3

Embodiments of the present application further provide a system for measuring nonlinear correlation parameters of a nonlinear device, including an apparatus for measuring nonlinear correlation parameters of a nonlinear device as described in Embodiment 2 and a nonlinear device, the contents of which are incorporated herein. The nonlinear device may be an electrical input and electrical output device, such as a radio frequency amplifier; can also be an optical input and electrical output device, such as an optical coherent receiver with a transimpedance amplifier, the input thereof being an optical signal and the output thereof being an electrical signal; however, the embodiments of the present application are not limited thereto.

Figure 13:
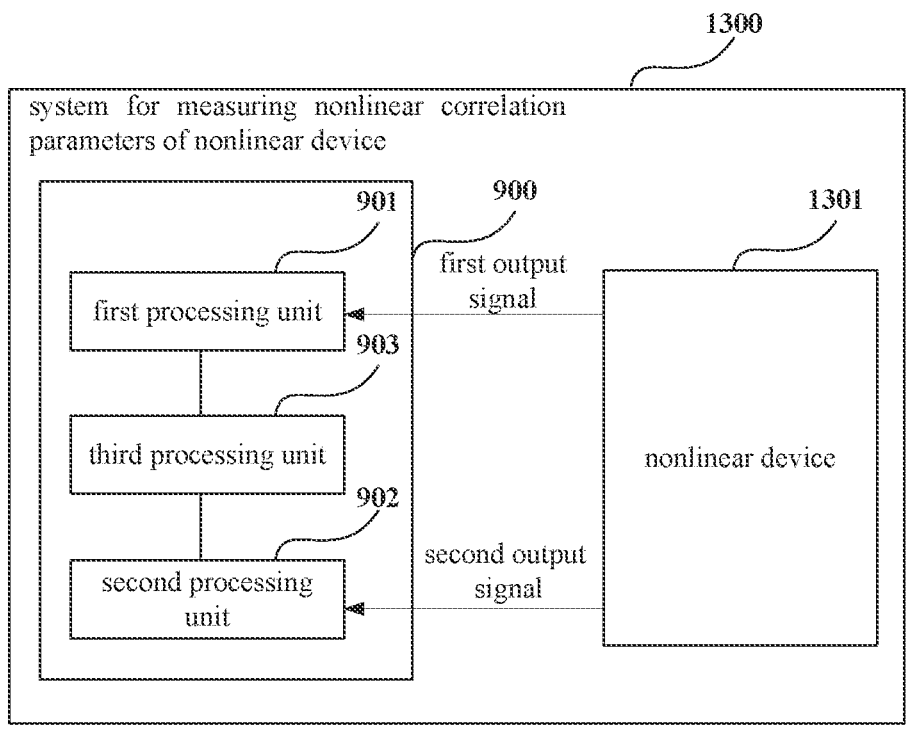
FIG. 13 is a schematic diagram showing the configuration of a system for measuring nonlinear correlation parameters of a nonlinear device according to Embodiment 3 of the present application.

FIG. 13 is a schematic diagram showing the configuration of a system for measuring nonlinear correlation parameters of a nonlinear device according to embodiments of the present application. As shown in FIG. 13, the system for measuring nonlinear correlation parameters of a nonlinear device includes: a nonlinear device 1301 and an apparatus 900 for measuring nonlinear correlation parameters of a nonlinear device. The apparatus 900 for measuring nonlinear correlation parameters of a nonlinear device includes a first generating unit 901, a second processing unit 902 and a third processing unit 903, the specific implementation of which may refer to Embodiment 2 and will not be repeated here.

Figure 14:
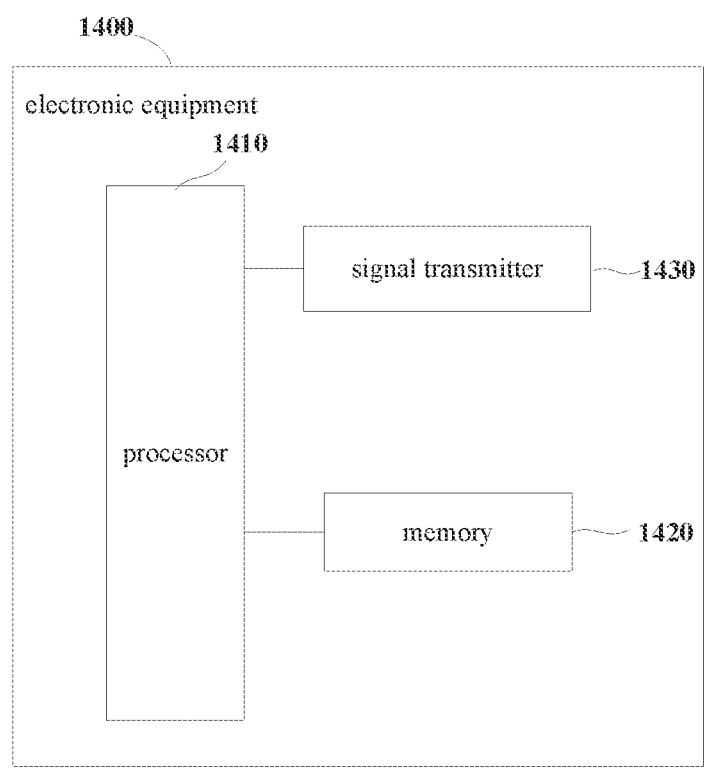
FIG. 14 is a configuration diagram of an electronic equipment.

FIG. 14 is a configuration diagram of an electronic equipment. As shown in FIG. 14, the electronic equipment 1400 includes a processor (such as a digital signal processor (DSP)) 1410 and a memory 1420; the memory 1420 is coupled to the processor 1410. Wherein the memory 1420 can store various data; a program for information processing is also stored and the program is executed under the control of the processor 1410. In addition, the electronic equipment 1400 also includes a signal transmitter 1430. The electronic equipment 1400 may implement the function of the apparatus 900 for measuring nonlinear correlation parameters of the nonlinear device.

In an embodiment, the function of the apparatus 900 for measuring nonlinear correlation parameters of the nonlinear device may be integrated into the processor 1410. Wherein, the processor 1410 may be configured to implement the method for measuring nonlinear correlation parameters of a nonlinear device as described in Embodiment 1.

In another embodiment, the apparatus 900 for measuring nonlinear correlation parameters of the nonlinear device may be configured separately from the processor 1410. For example, the apparatus 900 for measuring nonlinear correlation parameters of the nonlinear device may be configured as a chip connected to the processor 1410, the function of the apparatus 900 for measuring nonlinear correlation parameters of the nonlinear device being performed by the control of the processor 1410.

It is worth noting that the electronic equipment 1400 is not necessarily required to include all of the components shown in FIG. 14; in addition, the electronic equipment 1400 may further include components not shown in FIG. 14, with reference to the related art.

Through the embodiments of the present application, it is possible to accurately obtain the nonlinear correlation parameters of the nonlinear device when the signal to be measured is transmitted. Thus, the nonlinear correlation parameters can be accurately calculated for the signal to be measured having any signal probability distribution, and furthermore, the use of expensive high-frequency waveform analysis equipment can be avoided.

Embodiments of the present application also provide a computer-readable program, wherein when the program is executed in an apparatus for measuring nonlinear correlation parameters of the nonlinear device, the program causes a computer to execute, in the apparatus for measuring nonlinear correlation parameters of the nonlinear device, the method for measuring nonlinear correlation parameters of a nonlinear device as described above in Embodiment 1.

Embodiments of the present application further provide a storage medium in which a computer-readable program is stored, wherein the computer-readable program causes the computer to execute, in the apparatus for measuring nonlinear correlation parameters of the nonlinear device, the method for measuring nonlinear correlation parameters of a nonlinear device as described above in Embodiment 1.

The method of measuring filtering characteristics in an apparatus for measuring filtering characteristics described in connection with the embodiments in the present application may be embodied directly in hardware, a software module executed by a processor, or a combination of both, for example, in form of one or more units. For example, one or more of the functional block diagrams and/or one or more combinations of the functional block diagrams shown in the drawings may correspond to a software module or a hardware module of a computer program flow. These software modules may correspond to the respective operations shown in the drawings, for example, in form of one or more units. The hardware modules may be implemented, for example, by solidifying the software modules using a field programmable gate array (FPGA).

A software module may be located in an RAM memory, a flash memory, an ROM memory, an EPROM memory, an EEPROM memory, a register, a hard disk, a removable disk, a CD-ROM, or any other form of storage medium known in the art. A storage medium may be coupled to the processor to enable the processor to read information from and write information to the storage medium, or the storage medium may be an integral part of the processor. The processor and the storage medium may reside in an ASIC. The software module may be stored in a memory of the apparatus for measuring the filtering characteristic or in a memory card insertable into the apparatus for measuring the filtering characteristic.

One or more of the functional block diagrams and/or one or more combinations of the functional block diagrams shown in the drawings may be implemented as a general purpose processor, a digital signal processor (DSP), an application specific integrated circuit (ASIC), a field programmable gate array (FPGA) or other programmable logic devices, a discrete gate or a transistor logic device, a discrete hardware component, or any suitable combination thereof designed to perform the functions described in the present application. One or more of the functional block diagrams and/or one or more combinations of the functional block diagrams may also be implemented as combination of computing devices, e.g., combination of a DSP and a microprocessor, a plurality of microprocessors, one or more microprocessors in communication with the DSP, or any other such configuration.

The present application is described in combination with specific embodiments hereinabove, but a person skilled in the art should know clearly that the description is exemplary, but not limitation to the protection scope of the present application. A person skilled in the art can make various variations and modifications to the present application according to spirit and principle of the application, and these variations and modifications should also be within the scope of the present application.

Regarding the embodiments including the above multiple embodiments, the following supplements are also disclosed:

In an example, an electronic equipment may include a processor and a memory, the memory storing a computer-readable program, when executing the computer-readable program, the processor implementing a method for measuring nonlinear correlation parameters of a nonlinear device, the method including performing band-stop filtering on a signal to be measured to generate a notch signal, and calculating a first nonlinear correlation parameter of the nonlinear device when the signal to be measured is transmitted according to a first output signal of the nonlinear device after the notch signal is inputted into the nonlinear device; calculating gain compression correction coefficients according to a second output signal of the nonlinear device after the first input signal is inputted into the nonlinear device, the first input signal and the signal to be measured having identical power and different signal probability distribution; and correcting the first nonlinear correlation parameter according to the gain compression correction coefficients to obtain a second nonlinear correlation parameter of the nonlinear device when the signal to be measured is transmitted.

In an example, the first nonlinear correlation parameter or the second nonlinear correlation parameter may include a power-to-noise ratio.

In an example, the signal probability distribution of the first input signal may include signal probability distribution obtained according to a part of the signal to be measure that is filtered by the band-stop filtering; or signal probability distribution obtained according to Gaussian distribution.

In an example, the gain compression correction coefficient may include a first coefficient and a second coefficient. The first coefficient denotes a ratio of a root-mean-square amplitude or modulus of a linear item in a third output signal of the nonlinear device after the signal to be measured in inputted into the nonlinear device to a root-mean-square amplitude or modulus of the signal to be measured, and the second coefficient denotes a ratio of a root-mean-square amplitude or modulus of a linear item in the second output signal to a root-mean-square amplitude or modulus of the first input signal.

In an example, the calculating gain compression correction coefficients may include calculating a ratio of power of the third output signal to power of the signal to be measured and take the ratio as the first coefficient; and calculating a ratio of power of the second output signal to power of the first input signal and take the ratio as the second coefficient.

In an example, the calculating gain compression correction coefficients may include calculating a ratio of power of the first output signal to power of the notch signal and take the ratio as the first coefficient; and calculating a ratio of power of the fourth output signal to power of the second input signal and take the ratio as the second coefficient. The second input signal is obtained by performing the band-stop filtering on the first input signal, and the nonlinear device outputs the fourth output signal after the second input signal is inputted into the nonlinear device.

In an example, the calculating gain compression correction coefficients may include calculating power of a linear term in the third output signal and power of a linear term in the second output signal based on the first nonlinear correlation parameter or a second nonlinear correlation parameter obtained after a previous time of correction; calculating the first coefficient according to the power of the signal to be measured and the power of the linear term in the third output signal, and calculating the second coefficient according to the power of the first input signal and the power of the linear term in the second output signal; and correcting the first nonlinear correlation parameter or the second nonlinear correlation parameter obtained after the previous time of correction according to the calculated first coefficient and the second coefficient, so as to obtain a second nonlinear correlation parameter after this time of correction, when the second nonlinear correlation parameter after this time of correction satisfies a preset condition, determining the calculated first coefficient and the second coefficient as the gain compression correction coefficients, and taking the second nonlinear correlation parameter after this time of correction as the second nonlinear related coefficient.

In an example, when the second nonlinear correlation parameter after this time of correction does not satisfy the preset condition, the second nonlinear correlation parameter after this time of correction is taken as the second nonlinear correlation parameter after the previous time of correction, so that the first coefficient and the second coefficient are calculated again, and the second nonlinear correlation parameter after the previous time of correction is corrected.

In an example, a storage medium storing a computer-readable program for causing a computer to implement a method for measuring nonlinear correlation parameters of a nonlinear device, the method including performing band-stop filtering on a signal to be measured to generate a notch signal, and calculating a first nonlinear correlation parameter of the nonlinear device when the signal to be measured is transmitted according to a first output signal of the nonlinear device after the notch signal is inputted into the nonlinear device; calculating gain compression correction coefficients according to a second output signal of the nonlinear device after the first input signal is inputted into the nonlinear device, the first input signal and the signal to be measured having identical power and different signal probability distribution; and correcting the first nonlinear correlation parameter according to the gain compression correction coefficients to obtain a second nonlinear correlation parameter of the nonlinear device when the signal to be measured is transmitted.

In an example, the first nonlinear correlation parameter or the second nonlinear correlation parameter may include a power-to-noise ratio.

In an example, the signal probability distribution of the first input signal may include signal probability distribution obtained according to a part of the signal to be measure that is filtered by the band-stop filtering; or signal probability distribution obtained according to Gaussian distribution.

In an example, the gain compression correction coefficient may include a first coefficient and a second coefficient. The first coefficient denotes a ratio of a root-mean-square amplitude or modulus of a linear item in a third output signal of the nonlinear device after the signal to be measured in inputted into the nonlinear device to a root-mean-square amplitude or modulus of the signal to be measured, and the second coefficient denotes a ratio of a root-mean-square amplitude or modulus of a linear item in the second output signal to a root-mean-square amplitude or modulus of the first input signal.

In an example, the calculating gain compression correction coefficients may include calculating a ratio of power of the third output signal to power of the signal to be measured and take the ratio as the first coefficient; and calculating a ratio of power of the second output signal to power of the first input signal and take the ratio as the second coefficient.

In an example, the calculating gain compression correction coefficients may include calculating a ratio of power of the first output signal to power of the notch signal and take the ratio as the first coefficient; and calculating a ratio of power of the fourth output signal to power of the second input signal and take the ratio as the second coefficient. The second input signal is obtained by performing the band-stop filtering on the first input signal, and the nonlinear device outputs the fourth output signal after the second input signal is inputted into the nonlinear device.

In an example, the calculating gain compression correction coefficients may include calculating power of a linear term in the third output signal and power of a linear term in the second output signal based on the first nonlinear correlation parameter or a second nonlinear correlation parameter obtained after a previous time of correction; calculating the first coefficient according to the power of the signal to be measured and the power of the linear term in the third output signal, and calculating the second coefficient according to the power of the first input signal and the power of the linear term in the second output signal; and correcting the first nonlinear correlation parameter or the second nonlinear correlation parameter obtained after the previous time of correction according to the calculated first coefficient and the second coefficient, so as to obtain a second nonlinear correlation parameter after this time of correction. When the second nonlinear correlation parameter after this time of correction satisfies a preset condition, determining the calculated first coefficient and the second coefficient as the gain compression correction coefficients, and taking the second nonlinear correlation parameter after this time of correction as the second nonlinear related coefficient.

In an example, when the second nonlinear correlation parameter after this time of correction does not satisfy the preset condition, the second nonlinear correlation parameter after this time of correction is taken as the second nonlinear correlation parameter after the previous time of correction, so that the first coefficient and the second coefficient are calculated again, and the second nonlinear correlation parameter after the previous time of correction is corrected.

The invention claimed is:

1. An apparatus to measure nonlinear correlation parameters of a nonlinear device, comprising:
 a memory; and
 a processor coupled to the memory to control execution of a process to,
  perform band-stop filtering on a signal to be measured to generate a notch signal, and calculate a first nonlinear correlation parameter of the nonlinear device when the signal to be measured is transmitted according to a first output signal of the nonlinear device after the notch signal is input into the nonlinear device;
  calculate gain compression correction coefficients according to a second output signal of the nonlinear device after a first input signal is input into the nonlinear device, the first input signal and the signal to be measured having identical power and different signal probability distribution; and
  correct the first nonlinear correlation parameter according to the gain compression correction coefficients to obtain a second nonlinear correlation parameter of the nonlinear device when the signal to be measured is transmitted.

2. The apparatus according to claim 1, wherein,
the first nonlinear correlation parameter or the second nonlinear correlation parameter comprises: a power-to-noise ratio.

3. The apparatus according to claim 1, wherein,
the signal probability distribution of the first input signal comprises:
 signal probability distribution obtained according to a part of the signal to be measured that is filtered by the band-stop filtering; or
 signal probability distribution obtained according to Gaussian distribution.

4. The apparatus according to claim 1, wherein,
the gain compression correction coefficient comprises:
a first coefficient and a second coefficient,
wherein,
 the first coefficient denotes a ratio of a root-mean-square amplitude or modulus of a linear item in a third output signal of the nonlinear device after the signal to be measured is input into the nonlinear device to a root-mean-square amplitude or modulus of the signal to be measured, and
 the second coefficient denotes a ratio of a root-mean-square amplitude or modulus of a linear item in the second output signal to a root-mean-square amplitude or modulus of the first input signal.

5. The apparatus according claim 4, wherein to calculate the first and second coefficients, the process is to:
 calculate a ratio of power of the third output signal to power of the signal to be measured as the first coefficient; and
 calculate a ratio of power of the second output signal to power of the first input signal as the second coefficient.

6. The apparatus according claim 4, wherein to calculate the first and second coefficients, the process is to:
 calculate a ratio of power of the first output signal to power of the notch signal as the first coefficient; and
 calculate a ratio of power of a fourth output signal to power of a second input signal as the second coefficient;

wherein the second input signal is obtained by performing the band-stop filtering on the first input signal, and the nonlinear device outputs the fourth output signal after the second input signal is input into the nonlinear device.

7. The apparatus according claim 4, wherein the process is to:
calculate power of a linear term in the third output signal and power of a linear term in the second output signal based on the first nonlinear correlation parameter or a second nonlinear correlation parameter obtained after a previous time of correction;
calculate the first coefficient according to the power of the signal to be measured and the power of the linear term in the third output signal, and calculate the second coefficient according to the power of the first input signal and the power of the linear term in the second output signal; and
correct the first nonlinear correlation parameter or the second nonlinear correlation parameter obtained after the previous time of correction according to the calculated first coefficient and the second coefficient, so as to obtain a second nonlinear correlation parameter after a current time of correction,
when the second nonlinear correlation parameter after this time of correction satisfies a set condition, determining the calculated first coefficient and the second coefficient as the gain compression correction coefficients, and taking the second nonlinear correlation parameter after the current time of correction as the second nonlinear related coefficient.

8. The apparatus according to claim 7, wherein,
when the second nonlinear correlation parameter after the current time of correction does not satisfy the set condition,
the second nonlinear correlation parameter after the current time of correction is taken as the second nonlinear correlation parameter after the previous time of correction, so that the first coefficient and the second coefficient are recalculated, and the second nonlinear correlation parameter after the previous time of correction is corrected.

9. A system nonlinear correlation parameters of a nonlinear device, comprising a nonlinear device and the apparatus for measuring nonlinear correlation parameters of the nonlinear device as claimed in claim 1.

10. A method of measuring nonlinear correlation parameters of a nonlinear device, comprising:
performing band-stop filtering on a signal to be measured to generate a notch signal, and calculating a first nonlinear correlation parameter of the nonlinear device when the signal to be measured is transmitted according to a first output signal of the nonlinear device after the notch signal is input into the nonlinear device;
calculating gain compression correction coefficients according to a second output signal of the nonlinear device after a first input signal is input into the nonlinear device, the first input signal and the signal to be measured having identical power and different signal probability distribution; and
correcting the first nonlinear correlation parameter according to the gain compression correction coefficients to obtain a second nonlinear correlation parameter of the nonlinear device when the signal to be measured is transmitted.

11. The method according to claim 10, wherein,
the first nonlinear correlation parameter or the second nonlinear correlation parameter comprises: a power-to-noise ratio.

12. The method according to claim 10, wherein,
the signal probability distribution of the first input signal comprises:
signal probability distribution obtained according to a part of the signal to be measured that is filtered by the band-stop filtering; or
signal probability distribution obtained according to Gaussian distribution.

13. The method according to claim 10, wherein,
the gain compression correction coefficient comprises:
a first coefficient and a second coefficient,
wherein,
the first coefficient denotes a ratio of a root-mean-square amplitude or modulus of a linear item in a third output signal of the nonlinear device after the signal to be measured is input into the nonlinear device to a root-mean-square amplitude or modulus of the signal to be measured, and
the second coefficient denotes a ratio of a root-mean-square amplitude or modulus of a linear item in the second output signal to a root-mean-square amplitude or modulus of the first input signal.

14. The method according to claim 13, wherein the calculating gain compression correction coefficients comprises:
calculating a ratio of power of the third output signal to power of the signal to be measured as the first coefficient; and
calculating a ratio of power of the second output signal to power of the first input signal as the second coefficient.

15. The method according claim 13, wherein the calculating gain compression correction coefficients comprises:
calculating a ratio of power of the first output signal to power of the notch signal as the first coefficient; and
calculating a ratio of power of a fourth output signal to power of the second input signal as the second coefficient;
wherein the second input signal is obtained by performing the band-stop filtering on the first input signal, and the nonlinear device outputs the fourth output signal after the second input signal is input into the nonlinear device.

16. The method according claim 13, wherein the calculating gain compression correction coefficients comprises:
calculating power of a linear term in the third output signal and power of a linear term in the second output signal based on the first nonlinear correlation parameter or a second nonlinear correlation parameter obtained after a previous time of correction;
calculating the first coefficient according to the power of the signal to be measured and the power of the linear term in the third output signal, and calculating the second coefficient according to the power of the first input signal and the power of the linear term in the second output signal; and
correcting the first nonlinear correlation parameter or the second nonlinear correlation parameter obtained after the previous time of correction according to the calculated first coefficient and the second coefficient, so as to obtain a second nonlinear correlation parameter after a current time of correction,
when the second nonlinear correlation parameter after this time of correction satisfies a set condition, determining the calculated first coefficient and the second coefficient as the gain compression correction coefficients, and taking the second nonlinear correlation parameter after the current time of correction as the second nonlinear related coefficient.

17. The method according to claim 16, wherein,
when the second nonlinear correlation parameter after the current time of correction does not satisfy the set condition,
the second nonlinear correlation parameter after this time of correction is taken as the second nonlinear correlation parameter after the previous time of correction, so that the first coefficient and the second coefficient are recalculated, and the second nonlinear correlation parameter after the previous time of correction is corrected.

* * * * *